P. BONVILLAIN.

HYDRAULIC MOLDING PRESS.

APPLICATION FILED JAN. 4, 1908.

12,885. Reissued Nov. 24, 1908.

2 SHEETS—SHEET 1

Witnesses:

Harvey L. Lechner

Archibald Martin

Inventor:

Philibert Bonvillain by Atty Paul Synnestvedt

P. BONVILLAIN.

HYDRAULIC MOLDING PRESS.

APPLICATION FILED JAN. 4, 1908.

12,885. Reissued Nov. 24, 1908.

2 SHEETS—SHEET 2.

Witnesses:
Harvey L. Lechner
Archworth Martin

Inventor:
Philibert Bonvillain
by his atty Paul Synnestvedt

UNITED STATES PATENT OFFICE.

PHILIPERT BONVILLAIN, OF PARIS, FRANCE, ASSIGNOR TO E. H. MUMFORD COMPANY, OF PHILADELPHIA, PENNSYLVANIA, A CORPORATION OF PENNSYLVANIA.

HYDRAULIC MOLDING-PRESS.

No. 12,885. Specification of Reissued Letters Patent. Reissued Nov. 24, 1908.

Original No. 815,577, dated March 20, 1906, Serial No. 210,746. Application for reissue filed January 4, 1908. Serial No. 409,869.

*To all whom it may concern:*

Be it known that I, PHILIBERT BONVILLAIN, a citizen of the Republic of France, and a resident of Paris, France, have invented certain new and useful Improvements in or Relating to Hydraulic Molding-Presses, of which the following is a specification.

This invention relates to a hydraulic molding-press for foundries designed both so as to facilitate working and to reduce to a strict minimum the expenditure of water under pressure.

Figure 1:
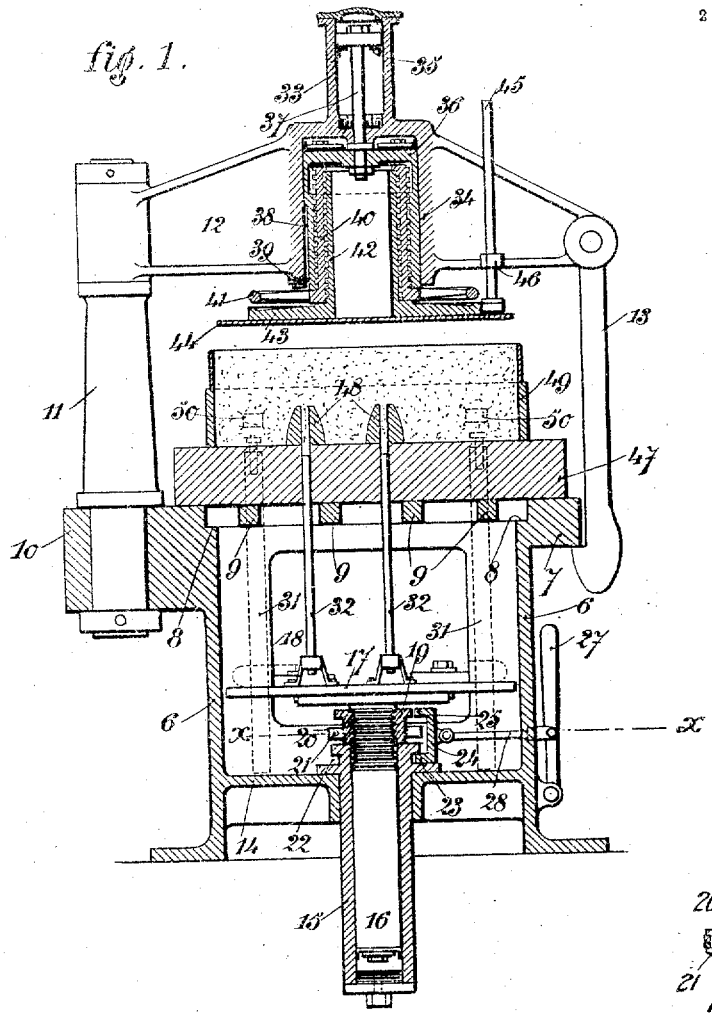
Figure 1A:
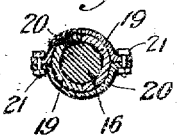
Figure 2:
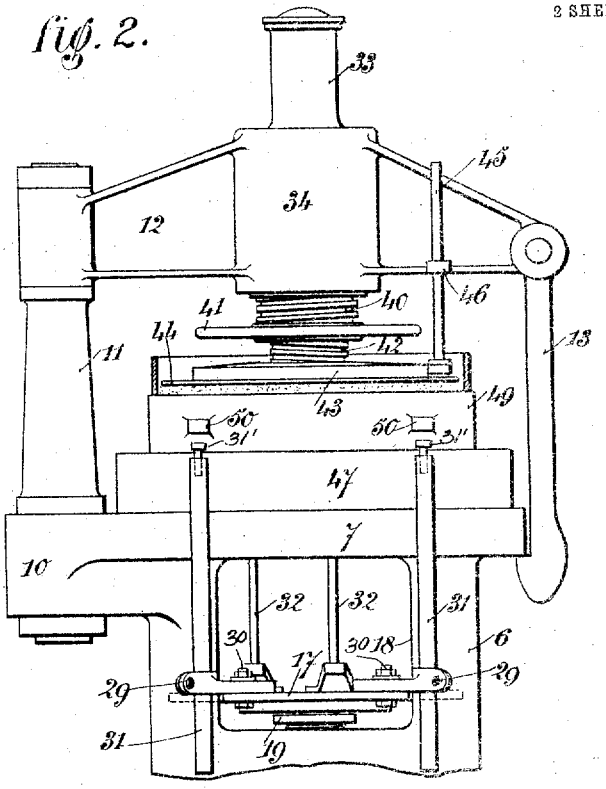
Figure 4:
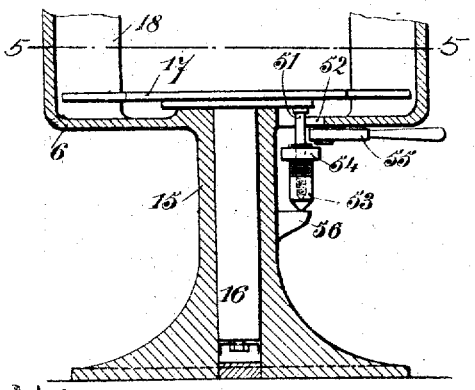
Figure 5:
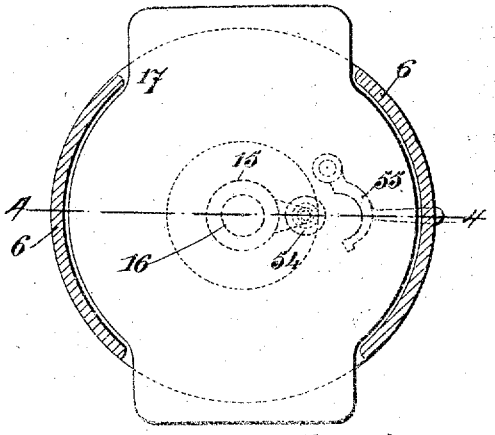

A press according to this invention is illustrated, by way of example, in the accompany drawings, in which:

Figure 1 is a sectional elevation. Figure 1ª is a horizontal section on a plane in the direction of line *x x* of Figure 1; Figure 2 a side elevation, and Figure 3 a plan. Figure 4 is a vertical section along the line 4 4 of Figure 5, showing a simplified construction of the press. Figure 5 is a horizontal section along the line 5 5 of Figure 4.

Figure 3:
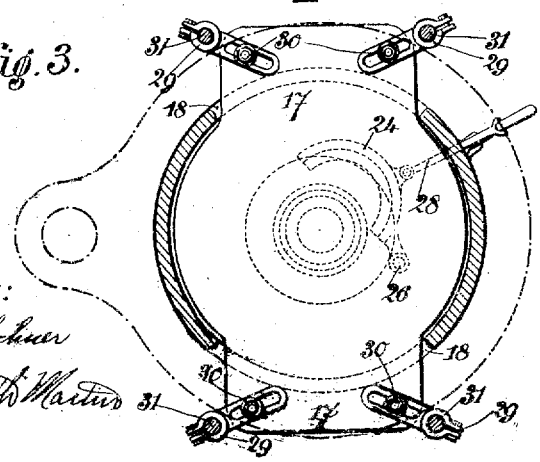

The machine shown in Figures 1 to 3 comprises a hollow frame 6 of round or rectangular shape, the upper portion of which forms a ring or other support or table 7, recessed at its inner edge for the purpose of forming a shoulder 8, intended to receive the ends of the bars 9 9. The table 7 is provided with a lateral lug 10, in which is mounted a vertical column 11, on the top of which is pivoted a swinging cross-beam 12. To the free end of this cross-beam is pivoted a depending hook 13, the lower end of which can engage under the outer edge of the table 7, as shown in the drawings.

On a horizontal partition 14 in the frame 6 is vertically mounted a cylinder 15, in which works a piston 16. This piston supports a mold-removing plate 17, the ends of which projecting beyond the frame, are guided in large openings 18 in the latter. The upper portion of the piston 16 is screw-threaded for the purpose of receiving a nut 19, also screw-threaded outside to receive a tapped collar or ring 20. This collar can be stopped by means of a set-screw.

The flange of the cylinder 15 is provided with a groove 22, adapted to receive the inner lower projection 23 of a half-ring 24, Figures 1 and 3, provided at the top with another inward projection 25, intended to form a stop for the collar 20, as hereinafter explained. The half-collar 24 is pivoted to a pin 26, secured to the partition 14, and is, on the other hand, connected by a rod 28 to an operating lever 27, pivoted to the frame 6.

On the mold-removing plate 17 are mounted the rod holders 29, secured to it by bolts 30, each bolt passing through an oblong hole, so that the holder can be set in any suitable position. Each rod-holder terminates in a split sleeve or socket for receiving the rod 31, which can be raised or lowered, as desired, and fixed by a clamping-screw, as shown in Figure 3. The plate 17 is also provided with core-pushers 32, or with stripping-plate lifters, according to circumstances.

The cross-beam 12 is cast or provided with two superposed cylinders 33 and 34 of different diameters on the same vertical axis, the smaller cylinder being above the larger one. These cylinders receive respectively, pistons 35 and 36, mounted on the same piston-rod 37, passing through the common separating plate or partition of the two cylinders. The piston 36 is provided at the side with a vertical groove 38, in which engages the end of a screw 39, secured to the lower edge of the cylinder 34, for preventing the piston 36 from turning. The piston is internally screw-threaded to receive a screw-threaded socket 40, having a hand-wheel 41 on its lower end, and the socket is also tapped to receive internally another socket terminating at the bottom in a flange or disk 43, to which is secured the press-plate 44. The disk 43 is provided with a vertical rod 45, freely sliding in a lug 46 on the cross-bar 12 for the purpose of preventing the socket 42 from turning.

The pattern-plate 47 48 is fixed to the table 7 over the cross-bars 9. The box 49, containing the sand required for molding, is placed in the usual manner on the pattern-plate 47 48. This box or flask is provided with lateral lugs 50, the under sides of which are adapted to contact with the lifting rods 31.

In order to effect a molding operation, the box 49 is filled with sand and is placed on the pattern-plate 47 48. The rod-holders 29 are then so arranged that the rods 31 are immediately below the lugs 50 of the box and at a certain distance therefrom, as will be further described below. The cross-beam 12 is brought into its normal position by engaging the hook 13 under the outer edge of the table 7. The pushers 32 are also put into place opposite the cores of the pattern-plate 47 48, (see Figure 1).

Water under pressure is being constantly admitted under the piston 35, which thus always has a tendency to raise the piston 36 and the plate 44 upward. After this rising the available height above the mold ready for compression is regulated by turning the hand-wheel 41. The socket 40 rotates with the hand-wheel, and since neither the piston 36 nor the socket 42 can turn the whole piston device will elongate or shorten, according as the hand-wheel is turned in one direction or the other. The pressure-plate 44 is thus brought by hand within a suitable distance of the flask 49, thus avoiding the unnecessary expenditure of water under pressure, and waste of time, which would be unavoidable without this arrangement. The height of the plate 44 is adjusted once and for all for a given height of pattern-plate and flask.

By means of suitable valve-gear water under pressure is admitted on the top of the large piston 36, (in the modification shown in Figure 1,) which descends with the pressure-plate 44 onto the sand contained in the box and compresses it in the usual manner. Water is then admitted under the piston 16, which raises the plate 17, the rods 31, and the pushers 32, which compress the cores and any other portion of the sand which is to be submitted to extra pressure from the under side. These pushers must at first only rise to the height required for effecting the above compression in a proper manner. Immediately that result is attained the upper end of the rods 31 must be so arranged as to come into contact with the lugs 50 on the box 49. For this purpose the rods are provided at their ends with adjustable heads 31′ 31′, which enable their length to be adjusted with all possible precision. Moreover, before the above mentioned operation takes place the half collar 24 is brought into engagement with the groove 22 of the cylinder 15, the position of the collar 20 having been regulated by turning it in one direction or the other, so that when the compression of the cores has been completed the collar 20 will engage against the upper projection 25 of the half-collar 24 and stop the ascent of the piston 16.

In the case where the large number of identical patterns are on the same plane, and consequently a large number of cores of the same height, the collar 20 is specially useful. Instead of adjusting the pushers singly for each core, they are all made of the same length, secured on the table 17 and at a single operation by adjusting the collar 20 the extent of compression is fixed for all the cores. The position of the collar 20 regulates, therefore, the upward stroke of the piston 16 to the required height for compressing the cores, and the machine is ready for removing the mold. In order to effect this removal, water is allowed to escape from the top cylinder 36, the piston of which rises under the action of the small piston 35, still containing water under pressure. By means of lever 27 the half-collar 24 is disengaged from the ring 20 and groove 22. There being now nothing to prevent the ascent of the piston 16, it rises under the action of the water, together with all the parts carried by it. The pushers 32 support the cores or other sand parts that they had previously compressed, and the rods 31 at the same time raise the flask 49 by means of its lugs 50 until it is sufficiently disengaged from the patterns 47 48 to enable it to be removed laterally. In the event of stripping plates being used for preventing any of the molded sand from being broken away these plates would also be raised by rods suitably arranged on the plate 17. The bars 9 being capable of being placed in any desired position, it is easy to arrange them suitably for allowing free passage to the pushers. The half-mold or flask 49 having been removed, the water from the cylinder 15 is allowed to escape, the nut 19 stopping the piston 16 and the plate 17 in their downward stroke on striking the upper edge of the cylinder 15. By adjusting the nut on the screw-threaded portion of the piston 16 the lower position of the plate 17 can be regulated so as to limit the length of the stroke for removing the mold for a given pattern-plate to the amount strictly necessary.

The machine shown in Figures 4 and 5 is intended for a smaller output or is of smaller size than the preceding one. The cylinder 15 of the piston 16 is cast in one piece with the frame 6. The upper flange of the piston 16, supporting the plate 17, is provided at the side, a vertical screw 51 passing through an aperture 52 in the frame 6. This screw has a nut 53 for limiting the length of travel of the mold-removing stroke for each pattern-plate by striking with its bottom portion a lateral projection 56 on the cylinder 15. This nut 53 has an outside screw-thread to receive a nut 54. This nut, together with the half-collar 55, pivoted under the frame 6, insures a fine adjustment of the amount of compression of the cores or other parts which have to be subjected to double pressure. This arrangement is similar to that previously described; but the parts are arranged at the side of the piston instead of being mounted directly upon it.

It will be understood that in either construction it is possible by using stripping-plates to obtain independently of the top compression of the sand by the piston 36 an under compression by the piston 16, and consequently a more homogeneous compression of the sand contained in the flask.

Having now particularly described and ascertained the nature of my said invention and in what manner the same is to be performed, I declare that what I claim is—

1. In a hydraulic molding-press, the combination with a frame forming a table at its upper part, of an upper turning cross-head mounted upon a column carried by the frame, a cylinder secured to said cross-head, a piston in the said cylinder, screw-sockets on the interior of the piston, a pressure-plate fixed upon the inner socket, a rod fixed upon one of said sockets and guided in a cavity of the cross-head, a cylinder formed with the first-named cylinder and located above and in line with it, a piston in the said second cylinder, a rod connecting this piston to the piston of the main cylinder, a hook jointed to the extremity of the turning cross-head, a lower plate carrying the means for removing the mold, and means for causing the said plate to ascend and descend, substantially as described and for the purpose specified.

2. In a hydraulic molding-press, the combination with the frame forming a table at its upper part, of an upper turning cross-head mounted upon a column carried by the frame, a cylinder connected with the said cross-head, a piston in the said cylinder, screw-sockets on the interior of the piston, a pressure-plate fixed upon the inner socket, a rod fixed upon one of said sockets and guided in a cavity of the cross-head, a cylinder formed with the first-named cylinder and located above and in line with it, a piston in the said second cylinder, a rod uniting this piston to the piston of the main cylinder, a hook jointed to the extremity of the turning cross-head, a lower plate carrying the means for removing the mold, a piston carrying the said lower plate, a cylinder for accommodating said piston, a screw-nut upon this piston, an adjustable collar screwed upon the said nut, a divided collar jointed upon the frame and having the upper and lower parts embracing the said collar, and an operating-lever connected with said collar, substantially as described and for the purpose specified.

3. In a molding-machine, the combination with a frame forming a table at its upper part, of a cylinder fixed upon this frame, a piston located in the said cylinder, a plate fixed on the upper part of said piston, rods placed upon the said plate, bolts upon the said plate, supports secured by these bolts, and rods seated in these supports and having adjustable heads, substantially as above described and for the purpose specified.

4. In combination, pattern and mold supporting means, a pattern having a part movable relative to the body of the pattern, means above the mold for compressing the sand constituting the mold and means for operating said part of the pattern and thereby applying additional compression to a portion only of the lower face of the mold.

5. In combination, a pattern plate, a mold flask mounted thereover, means above the mold for compressing the sand constituting the mold, upwardly movable means below the mold for applying additional compression to a portion only of the lower face of the mold and lifting means for the mold flask mounted to move with the last mentioned means and adapted to engage the mold flask and move it away from the pattern plate after the additional compression is accomplished.

6. In combination, a pattern plate, a mold flask mounted thereover, means above the mold for compressing the sand constituting the mold, upwardly movable means below the mold for applying additional compression to a portion only of the lower face of the mold and lifting means for the mold flask mounted to move with the last mentioned means and adapted to engage the mold flask and move it away from the pattern plate after the additional compression is accomplished and releasable means for stopping the upwardly movable means when the additional compression is accomplished.

7. A ram and stop means therefor, comprising a cylinder carrying an adjustable stop nut and provided with a lateral engaging ledge and a transversely movable stop member having a pair of inturned edge portions adapted to engage the said ledge and the stop nut.

8. A molding machine comprising in combination, pattern and flask supporting means, a power operated pressure piston above the said means, a vertically movable frame beneath the said means, members mounted upon such frame and extending up through the said means for engaging portions of the mold and other members mounted upon such frame and adapted to engage the flask and elevate it when the frame is raised.

In testimony whereof I have hereunto signed my name in the presence of the two subscribed witnesses.

PHILIBERT BONVILLAIN.

Witnesses:
DEAN M. MASON,
JULIEN EAUERNE.